(12) United States Patent
Bryan et al.

(10) Patent No.: US 12,190,290 B2
(45) Date of Patent: Jan. 7, 2025

(54) SYSTEM AND METHOD FOR MANAGEMENT OF PERPETUAL INVENTORY VALUES BASED UPON CUSTOMER PRODUCT PURCHASES

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/212,800

(22) Filed: Jun. 22, 2023

(65) Prior Publication Data
US 2023/0334422 A1 Oct. 19, 2023

Related U.S. Application Data

(63) Continuation of application No. 17/090,231, filed on Nov. 5, 2020, now Pat. No. 11,715,066, which is a
(Continued)

(51) Int. Cl.
*G06Q 20/00* (2012.01)
*G06Q 10/0875* (2023.01)
*G06Q 40/12* (2023.01)

(52) U.S. Cl.
CPC ......... *G06Q 10/0875* (2013.01); *G06Q 40/12* (2013.12)

(58) Field of Classification Search
CPC ............................ G06Q 10/0875; G06Q 40/12
See application file for complete search history.

(56) References Cited

U.S. PATENT DOCUMENTS

| 5,392,382 A | 2/1995 | Schoppers |
|---|---|---|
| 5,544,282 A | 8/1996 | Chen |

(Continued)

FOREIGN PATENT DOCUMENTS

| CA | 2682886 | 4/2010 |
|---|---|---|
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.
(Continued)

*Primary Examiner* — Rokib Masud
(74) *Attorney, Agent, or Firm* — Fitch, Even, Tabin & Flannery LLP

(57) ABSTRACT

A data structure programmatically links the first product to a second product. The second product is historically purchased by the customer whenever the customer has also purchased the first product. A determination is made as to whether the customer purchased the second product together with the first product based upon the sales data. When the customer has failed to purchase the second product with the first product, instructions are transmitted to the retail store over the network to perform a verification that the second product is out-of-stock. An outcome of the verification from the retail store is received via the network. A determination is made as to a level of certainty that the second product is actually out-of-stock based upon an analysis of the sales data and the outcome of the verification. When the level of certainty exceeds a predetermined threshold, the PI value is adjusted to zero.

18 Claims, 4 Drawing Sheets

Related U.S. Application Data continuation of application No. 15/918,436, filed on Mar. 12, 2018, now abandoned.

(60) Provisional application No. 62/471,455, filed on Mar. 15, 2017.

(56) References Cited

U.S. PATENT DOCUMENTS

| | | |
|---|---|---|
| 5,963,919 A | 10/1999 | Brinkley |
| 6,681,990 B2 | 1/2004 | Vogler |
| 6,726,099 B2 | 4/2004 | Becker |
| 6,758,403 B1 | 7/2004 | Keys |
| 6,876,991 B1 | 4/2005 | Owen |
| 6,889,165 B2 | 5/2005 | Lind |
| 7,084,769 B2 | 8/2006 | Bauer |
| 7,222,786 B2 | 5/2007 | Renz |
| 7,370,005 B1 | 5/2008 | Ham |
| 7,401,057 B2 | 7/2008 | Eder |
| 7,480,623 B1 | 1/2009 | Landvater |
| 7,523,065 B2 | 4/2009 | Eder |
| 7,552,066 B1 | 6/2009 | Landvater |
| 7,580,848 B2 | 8/2009 | Eder |
| 7,616,117 B2 | 11/2009 | Streeb |
| 7,693,757 B2 | 4/2010 | Zimmerman |
| 7,788,119 B2 | 8/2010 | Najmi |
| 7,792,709 B1 | 9/2010 | Trandal |
| 7,950,579 B2 | 5/2011 | Gray |
| 7,954,712 B2 | 6/2011 | Babcock |
| 8,091,782 B2 | 1/2012 | Cato |
| 8,107,736 B2 | 1/2012 | Brown |
| 8,189,855 B2 | 5/2012 | Opalach |
| 8,191,672 B2 | 6/2012 | Kondo |
| 8,195,533 B1 | 6/2012 | Mishra |
| 8,224,717 B2 | 7/2012 | Giacobbe |
| 8,260,456 B2 | 9/2012 | Siegel |
| 8,321,302 B2 | 11/2012 | Bauer |
| 8,321,303 B1 | 11/2012 | Krishnamurthy |
| 8,346,630 B1 | 1/2013 | Mckeown |
| 8,423,431 B1 | 4/2013 | Rouaix |
| 8,521,620 B2 | 8/2013 | Livingston |
| 8,577,136 B1 | 11/2013 | Ascher |
| 8,616,822 B1 | 12/2013 | Winkler |
| 8,732,039 B1 | 5/2014 | Chen |
| 8,965,796 B1 | 2/2015 | Gala |
| 9,120,622 B1 | 9/2015 | Elazary |
| 9,165,277 B2 | 10/2015 | Jones |
| 9,171,278 B1 | 10/2015 | Kong |
| 9,205,886 B1 | 12/2015 | Hickman |
| 9,280,757 B2 | 3/2016 | Parpia |
| 9,378,484 B1 | 6/2016 | Russell |
| 9,415,935 B1 | 8/2016 | Macfarlane |
| 9,758,301 B2 | 9/2017 | Porat |
| 10,019,803 B2 | 7/2018 | Venable |
| 10,089,055 B1 | 10/2018 | Fryman |
| 10,130,177 B2 | 11/2018 | Jones |
| 10,130,232 B2 | 11/2018 | Atchley |
| 10,138,060 B1 | 11/2018 | Mantha |
| 10,169,738 B2 | 1/2019 | Jones |
| 10,189,642 B2 | 1/2019 | High |
| 10,192,157 B2 | 1/2019 | Cote |
| 10,289,990 B2 | 5/2019 | Rizzolo |
| 10,311,400 B2 | 6/2019 | Mascorro Medina |
| 10,360,548 B2 | 7/2019 | Brooks |
| 10,373,116 B2 | 8/2019 | Medina |
| 10,453,009 B2 | 10/2019 | Ulrich |
| 10,467,587 B2 | 11/2019 | Bogolea |
| 10,489,677 B2 | 11/2019 | Rzeszutek |
| 10,505,057 B2 | 12/2019 | Haist |
| 10,546,258 B2 | 1/2020 | Jones |
| 10,552,792 B2 | 2/2020 | Mattingly |
| 10,558,947 B2 | 2/2020 | Bryan |
| 10,997,552 B2 | 5/2021 | Bryan |
| 11,055,662 B2 | 7/2021 | Bryan |
| 11,282,157 B2 | 3/2022 | Bryan |
| 11,449,828 B2 | 9/2022 | Bryan |
| 11,501,251 B2 | 11/2022 | Bryan |
| 11,715,066 B2 | 8/2023 | Bryan |
| 11,797,929 B2 | 10/2023 | Bryan |
| 11,816,628 B2 | 11/2023 | Bryan |
| 11,868,960 B2 | 1/2024 | Bryan |
| 2001/0047293 A1 | 11/2001 | Waller |
| 2002/0138336 A1 | 9/2002 | Bakes |
| 2002/0174001 A1 | 11/2002 | Henry |
| 2003/0216969 A1 | 11/2003 | Bauer |
| 2003/0233277 A1 | 12/2003 | Saunders |
| 2004/0158507 A1 | 8/2004 | Meek |
| 2006/0157150 A1 | 7/2006 | Blakeslee |
| 2006/0184511 A1 | 8/2006 | Koo |
| 2007/0021864 A1 | 1/2007 | Mountz |
| 2007/0144991 A1 | 6/2007 | Hansl |
| 2007/0288439 A1 | 12/2007 | Rappaport |
| 2008/0077510 A1 | 3/2008 | Dielemans |
| 2008/0114651 A1 | 5/2008 | Jain |
| 2008/0120205 A1 | 5/2008 | Hoopes |
| 2008/0140491 A1 | 6/2008 | Jain |
| 2008/0255968 A1 | 10/2008 | Heinrichs |
| 2008/0270269 A1 | 10/2008 | Myers |
| 2008/0288595 A1 | 11/2008 | Liu |
| 2009/0060349 A1 | 3/2009 | Linaker |
| 2009/0063310 A1 | 3/2009 | Alonzo |
| 2009/0101713 A1 | 4/2009 | Ulrich |
| 2009/0157533 A1 | 6/2009 | Ohno |
| 2010/0023459 A1 | 1/2010 | Sundby |
| 2010/0095269 A1 | 4/2010 | Bouillet |
| 2010/0106609 A1 | 4/2010 | Sherman |
| 2010/0138037 A1 | 6/2010 | Adelberg |
| 2011/0093418 A1 | 4/2011 | Kwok |
| 2011/0131557 A1 | 6/2011 | Bouillet |
| 2012/0209734 A1 | 8/2012 | Brooks |
| 2012/0259655 A1 | 10/2012 | Madreperla |
| 2012/0310781 A1* | 12/2012 | Battle ............... G06Q 40/00 705/26.63 |
| 2013/0018696 A1 | 1/2013 | Meldrum |
| 2013/0124189 A1 | 5/2013 | Baldwin |
| 2013/0211870 A1 | 8/2013 | Lawson |
| 2014/0006131 A1 | 1/2014 | Causey |
| 2014/0006229 A1 | 1/2014 | Birch |
| 2014/0067634 A1 | 3/2014 | Sowder |
| 2014/0100769 A1 | 4/2014 | Wurman |
| 2014/0101088 A1 | 4/2014 | Hall |
| 2014/0122391 A1 | 5/2014 | Mugan |
| 2014/0143039 A1 | 5/2014 | Branton |
| 2014/0180865 A1* | 6/2014 | Argue ............... G06Q 30/0633 705/26.7 |
| 2014/0201042 A1 | 7/2014 | Meyer |
| 2014/0247116 A1 | 9/2014 | Davidson |
| 2014/0344118 A1 | 11/2014 | Parpia |
| 2014/0379535 A1 | 12/2014 | Briet |
| 2015/0039373 A1 | 2/2015 | Anand |
| 2015/0154256 A1 | 6/2015 | McKenna |
| 2015/0178654 A1 | 6/2015 | Glasgow |
| 2015/0235157 A1 | 8/2015 | Avegliano |
| 2015/0242805 A1* | 8/2015 | Sakurai ............... G06Q 30/00 705/28 |
| 2015/0379366 A1 | 12/2015 | Nomura |
| 2016/0042315 A1 | 2/2016 | Field-Darragh |
| 2016/0114488 A1 | 4/2016 | Mascorro Medina |
| 2016/0132823 A1 | 5/2016 | Swafford |
| 2016/0132910 A1* | 5/2016 | Appel ............... G06Q 30/0202 705/7.31 |
| 2016/0171428 A1 | 6/2016 | Gooijer |
| 2016/0371613 A1 | 12/2016 | Ulrich |
| 2017/0148005 A1 | 5/2017 | Murn |
| 2017/0155788 A1 | 6/2017 | Kobayashi |
| 2017/0193430 A1 | 7/2017 | Barreira Avegliano |
| 2017/0200106 A1 | 7/2017 | Jones |
| 2017/0277863 A1 | 9/2017 | Subra |
| 2017/0287038 A1 | 10/2017 | Krasadakis |
| 2018/0005174 A1 | 1/2018 | Dixon |
| 2018/0060804 A1 | 3/2018 | Cheruku |
| 2018/0089613 A1 | 3/2018 | Chen |
| 2018/0152884 A1 | 5/2018 | Hu |
| 2018/0268355 A1 | 9/2018 | Bryan |
| 2018/0268356 A1 | 9/2018 | Bryan |

(56) References Cited

U.S. PATENT DOCUMENTS

| | | |
|---|---|---|
| 2018/0268364 A1 | 9/2018 | Bryan |
| 2018/0268365 A1 | 9/2018 | Bryan |
| 2018/0268366 A1 | 9/2018 | Bryan |
| 2018/0268367 A1 | 9/2018 | Bryan |
| 2018/0268509 A1 | 9/2018 | Bryan |
| 2018/0341906 A1 | 11/2018 | Bryan |
| 2019/0057449 A1 | 2/2019 | Berd |
| 2019/0073775 A1 | 3/2019 | Lam |
| 2019/0149725 A1 | 5/2019 | Adato |
| 2019/0156821 A1 | 5/2019 | Zamora Duran |
| 2019/0215424 A1 | 7/2019 | Adato |
| 2019/0291954 A1 | 9/2019 | Lee |
| 2019/0303863 A1 | 10/2019 | Ghosh |
| 2020/0342561 A1 | 10/2020 | Bryan |
| 2020/0349499 A1 | 11/2020 | Bryan |
| 2021/0056506 A1 | 2/2021 | Bryan |
| 2021/0090015 A1 | 3/2021 | Bryan |
| 2021/0201255 A1 | 7/2021 | Bryan |
| 2021/0264360 A1 | 8/2021 | Bryan |
| 2021/0295253 A1 | 9/2021 | Bryan |
| 2024/0013148 A1 | 1/2024 | Bryan |
| 2024/0046205 A1 | 2/2024 | Bryan |
| 2024/0095672 A1 | 3/2024 | Bryan |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"Shelf Monitor"; Tech Mahindra; https://www.techmahindra.com/industries/Enterprise/retail_and_cpg/retail/solutions/shelf_monitor.aspx; 2016; pp. 1-1.

Angell, Robert C., "Control of State-Wide Liquor Inventories", National Association of Cost Accountants; NACA Bulletin (pre-1986); Feb. 15, 1948; pp. 1-9.

Bourzac, Katherine; "A Robot Takes Stock"; https://www.technologyreview.com/s/428374/arobottakesstock/; Published Jun. 29, 2012; pp. 1-4.

Fraunhofer; "The flying inventory assistant"; http://www.fraunhofer.de/en/press/research-news/2014/december/the-flying-inventoryassistant.html; Published Dec. 1, 2014; pp. 1-3.

Gruen, Thomas W., et al.; "A Comprehensive Guide To Retail Out-of-Stock Reduction In the Fast-Moving Consumer Goods Industry"; 2007; 71 pgs.

Kang, Yun, et al.; "Information Inaccuracy in Inventory Systems—Stock Loss and Stockout"; Massachusetts Institute of Technology; Published Aug. 23, 2004; 29 pages.

Lowe's Home Improvement; "Lowe's Introduces LoweBot"; https://www.youtube.com/watch?v=hP3yfGHTXFo; Published on Aug. 30, 2016; pp. 1-10.

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.

SAP; "How to Set Up and Manage a Perpetual Inventory System"; SAP; Jun. 22, 2016; pp. 1-108.

Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.

Trujillo, Paul; "Walmart is Addressing Inventory Problems With a New System"; http://www.waspbarcode.com/buzz/walmart-2/; Nov. 15, 2016; pp. 1-7.

Vanian, Jonathan; "Target's New Robot Helper Is Busy At Work On Aisle 3"; http://fortune.com/2016/04/28/targettestingrobotinventorysimbe/; Published Apr. 28, 2016; pp. 1-8.

Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

* cited by examiner

SYSTEM AND METHOD FOR MANAGEMENT OF PERPETUAL INVENTORY VALUES BASED UPON CUSTOMER PRODUCT PURCHASES

CROSS-REFERENCE TO RELATED APPLICATIONS

This application is a continuation of U.S. application Ser. No. 17/090,231, filed Nov. 5, 2020, which is a continuation of U.S. application Ser. No. 15/918,436, filed Mar. 12, 2018, which claims the benefit of the following U.S. Provisional Application No. 62/471,455, filed Mar. 15, 2017, all of which are incorporated herein by reference in their entireties.

TECHNICAL FIELD

This invention relates generally to the management of perpetual inventory values, and more particularly, to the management of perpetual inventory values by analyzing customer purchases.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Stores also utilize other measures that relate to the value and availability of products for accounting and other purposes. For example, a book value of a product may be the value of all of the product present in the retail store.

Sometimes the PI value does not accurately reflect the correct number of products in the store. This can happen for a variety of reasons including mis-scanning products as the products leave or depart the store, or other forms of human error. If the PI value is incorrect, then various problems can develop. For instance, shipments can be ordered at the wrong times and for the wrong quantity of products.

BRIEF DESCRIPTION OF THE DRAWINGS

Disclosed herein are embodiments of systems, apparatuses and methods pertaining to managing perpetual inventory values based upon customer purchases. This description includes drawings, wherein.

Figure 1:
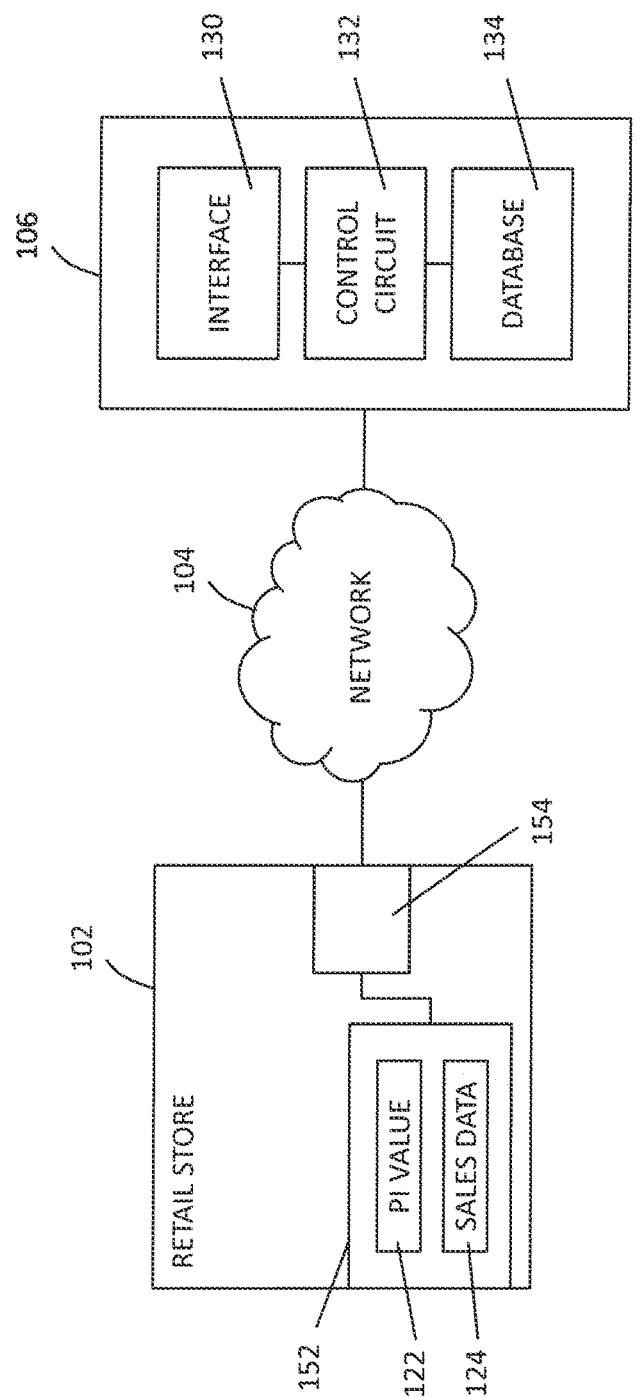
FIG. 1 is a block diagram showing one example of a system that adjusts the PI of a product using customer sales data in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that adjust perpetual inventory values based upon customer purchases. Two different products are typically purchased together by a customer, but on one occasion the customer only purchases one product and not the other. However, the PI value of the non-purchased product still shows the non-purchased product as being available in the retail store. In the present approaches, the PI value of the non-purchased product is adjusted with a degree of confidence as to the accuracy of the adjustment. In aspects, the degree of confidence is determined based upon taking actions such as verifying that the item is not on the shelf. The degree of confidence is also influenced by other information, e.g., demographic information about the customer, or whether there was a weather event that may have influenced shipments to the store, to mention two examples.

In many of these embodiments, a system that is configured to adjust perpetual inventory (PI) values of products includes a transceiver circuit, a network, an interface, a database, and a control circuit.

The transceiver circuit is disposed at a retail store, and is configured to transmit sales data related to a first product purchased by a customer at the retail store. The network is coupled to the transmitter circuit. The interface is coupled to the network and is configured to receive the sales data from the transceiver circuit via the network. The interface is disposed at a central processing center.

The database includes a data structure. The data structure programmatically links the first product to a second product. The second product is historically purchased by the customer whenever the customer has also purchased the first product. The database is disposed at the central processing center.

The control circuit is coupled to the interface and the database. The control circuit is disposed at the central processing center and configured to determine whether the customer purchased the second product together with the first product based upon analyzing the sales data. The control circuit is configured to, when the customer has failed to purchase the second product with the first product, transmit instructions to the transceiver circuit via the interface and network to perform a verification at the retail store that the second product is out-of-stock. The control circuit is additionally configured to receive an outcome of the verification from the transceiver circuit at the retail store via the network and the interface. The control circuit is further configured to determine a level of certainty that the second product is actually out-of-stock based upon an analysis of the sales data and the outcome of the verification. The control circuit is configured to, when the level of certainty exceeds a predetermined threshold, adjust the PI value to zero. The control circuit is configured to transmit the adjusted PI value to the transceiver circuit at the retail store via the interface and the network.

In aspects, the system also includes an automated vehicle at the retail store. The instructions cause the automated vehicle at the retail store to verify that that the second product is not present at the retail store. In other aspects, the automated vehicle maneuvers to a shelf where the second product is shelved. In examples, the automated vehicle is an aerial drone or a ground vehicle.

In other examples, the instructions are a message to an employee at the retail store to verify that that the second product is not present at the retail store. The network may be any type of network such as the cloud network.

The sales data can be a wide variety of data. For example, the sales data may include point-of-sale data indicating that a customer purchased the first product but not the second product, a scan of a shelf where the second product is disposed, demographic information of the customer, information related to a weather event, information concerning how the customer paid for the first product, or information concerning the path of the customer through the store. Other examples are possible.

In other embodiments, sales data related to a first product purchased by a customer in a retail store is transmitted from the retail store to a central processing center. The sales data is received at the central processing center. A data structure at a database at the central processing center is stored. The data structure programmatically links the first product to a second product. The second product is historically purchased by the customer whenever the customer has also purchased the first product. At the central processing center, a determination is made as to whether the customer purchased the second product together with the first product based upon the sales data.

When the customer has failed to purchase the second product with the first product, instructions are transmitted to the retail store over the network to perform a verification that the second product is out-of-stock. An outcome of the verification from the retail store is received via the network. At the central processing center, a determination is made as to a level of certainty that the second product is actually out-of-stock based upon an analysis of the sales data and the outcome of the verification. When the level of certainty exceeds a predetermined threshold, the PI value is adjusted to zero.

In still others of these embodiments, a system is configured to adjust perpetual inventory (PI) values of products. The system includes an automated vehicle, a sales entry device or sensor, a transceiver circuit, a network, an interface, a database, and a control circuit.

The automated vehicle is disposed at a retail store. The sales entry device or sensor is disposed at the retail store. The sales entry device or sensor is configured to collect sales data related to a first product purchased by a customer at the retail store.

The transceiver circuit is disposed at the retail store and coupled to the sales entry device or sensor. The transceiver circuit is configured to transmit the sales data related to the first product purchased by a customer at the retail store. The network is coupled to the transceiver circuit.

The interface is coupled to the network and is configured to receive the sales data from the transceiver circuit via the network. The interface is disposed at a central processing center.

The database includes a data structure. The data structure programmatically links the first product to a second product. The second product is historically purchased by the customer whenever the customer has also purchased the first product. The database is disposed at the central processing center.

The control circuit is coupled to the interface and the database. The control circuit is disposed at the central processing center and is configured to determine whether the customer purchased the second product together with the first product based upon an analysis of the sales data. The control circuit is further configured to, when the customer has failed to purchase the second product with the first product, transmit instructions to the automated vehicle via the transceiver circuit, the interface and the network. The instructions are effective to cause the automated vehicle to perform a verification at the retail store that the second product is out-of-stock.

The control circuit is also configured to receive an outcome of the verification from the automated vehicle. The outcome is transmitted from the transceiver circuit at the retail store to the network and to the interface.

The control circuit is further configured to determine a level of certainty that the second product is actually out-of-stock based upon an analysis of the sales data, the outcome of the verification, and results of verifications at other retail stores. The control circuit is configured to, when the level of certainty exceeds a predetermined threshold, adjust the PI value to zero. The control circuit is still further configured to transmit the adjusted PI value to the transceiver circuit at the retail store via the interface and the network.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples.

The retail store 102 includes a database 152 that stores for each product a PI value 122. The PI value 122 for the selected product indicates the amount of a selected product in the retail store.

The database 152 may also include sales data 124. The sales data 124 can be a wide variety of information. For example, the sales data 124 may include point-of-sale data indicating that a customer purchased the first product but not the second product, a scan of a shelf where the second product is disposed, demographic information of the customer, information related to a weather event, information concerning how the customer paid for the first product, or information concerning the path of the customer through the store. The sales data 124 may be obtained by sales entry devices or sensors 158 (e.g., cameras, other sensing devices (RFID sensors), or cash registers) or may be manually entered into the database 152.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples). The communication device 154 may transmit the PI value 122 and the sales data 124 from the retail store 102.

Cloud network 104 is coupled to the communication device 154 (e.g., a transceiver) at the retail store 102. The cloud network 104 may be any type of computer or communication network and may include routers, gateways, and servers to mention a few examples of devices that can form or be utilized in the network 104. The cloud network 104 may also be combinations of various types of networks.

The apparatus 106 includes an interface 130, a control circuit 132, and a database 134. The interface 130 is configured to receive from the retail store 102 the perpetual inventory (PI) value 122 associated with the selected product and the sales data 124. The database 134 stores the PI value 122 and the sales data 124. The apparatus 106 may be deployed at a central processing center such as the home office of the retail store.

In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations.

The control circuit 132 is coupled to the interface 130 and the database 134. The control circuit 132 is configured to obtain the PI value 122 and the sales data 124 from the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is configured to, when the customer has failed to purchase the second product with the first product, transmit instructions to the communication device (e.g., transceiver circuit) 154 via the interface 130 and network 104 to perform a verification at the retail store that the second product is out-of-stock. The verification may be accomplished using the automated vehicle 156, which is in communication with the communication device 154. The control circuit 132 is additionally configured to receive an outcome of the verification from the transceiver circuit 154 at the retail store 102 via the network 104 and the interface 130. The control circuit 132 is configured to determine a level of certainty that the second product is actually out-of-stock based upon an analysis of the sales data 124 and the outcome of the verification. Additionally, the results of verifications (or certainty level calculations) performed or made at other retail stores can be considered (e.g., whether the product was ever located). These may be stored in the database 134. Thus, the experience and knowledge gained from decisions made with respect to other stores can be applied to obtain better decisions with respect to levels of certainty for the current store being evaluated.

The control circuit 132 is configured to, when the level of certainty exceeds a predetermined threshold, adjust the PI value 122 to zero. The control circuit 132 is configured to transmit the adjusted PI value 122 to the transceiver circuit 154 at the retail store via the interface and the network.

In aspects, the system also includes an automated vehicle 156 deployed at the retail store 102. The instructions formed by the control circuit 132 cause the automated vehicle 156 at the retail store 102 to verify that that the second product is not present at the retail store. In other aspects, the automated vehicle 156 maneuvers to a shelf where the second product is shelved. In examples, the automated vehicle is an aerial drone or a ground vehicle.

In other examples, the instructions are a message to an employee at the retail store 102 to verify that that the second product is not present at the retail store 102.

Figure 2:
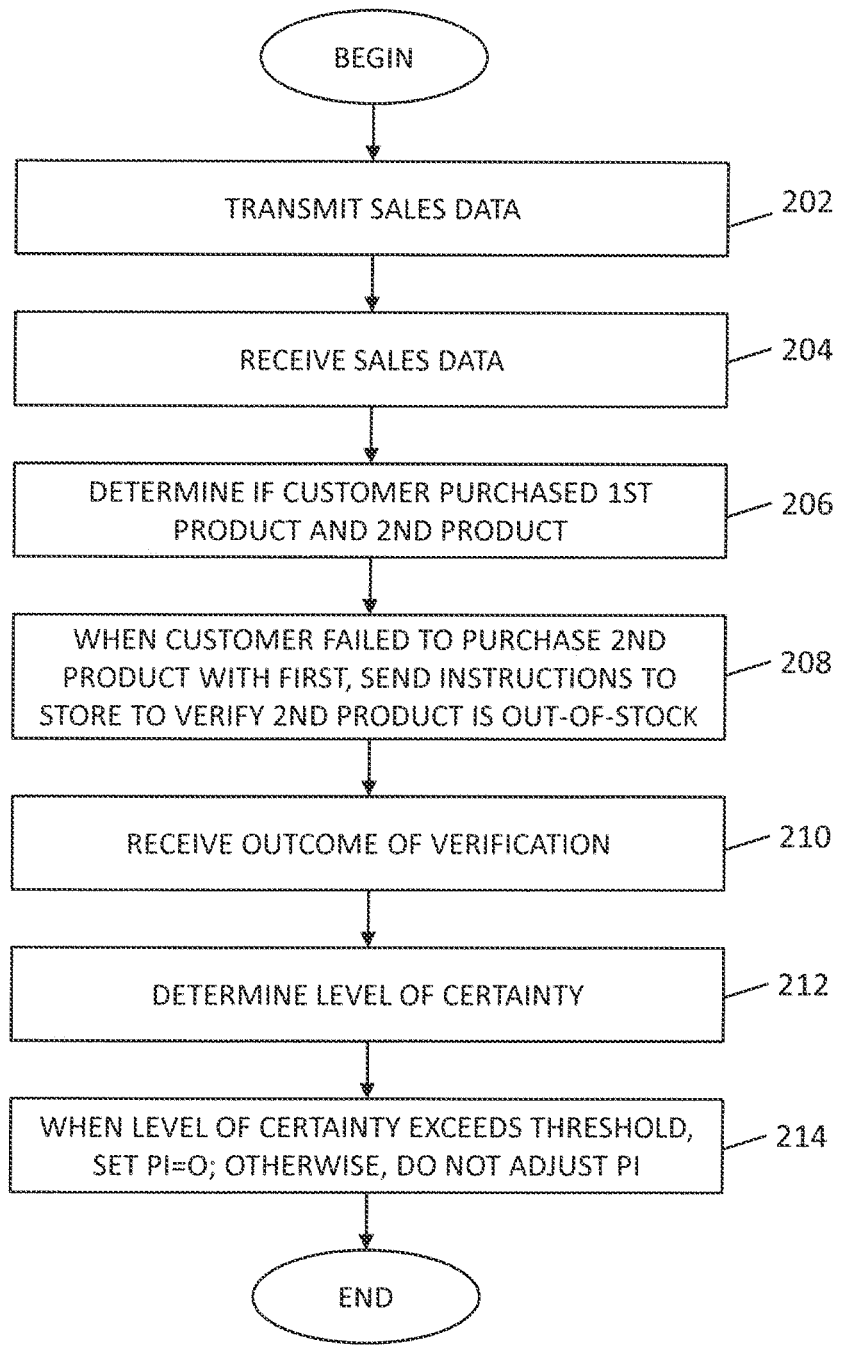
FIG. 2 is a flowchart showing one example of an approach for adjusting the PI of a selected product using customer sales data in accordance with some embodiments.

Referring now to FIG. 2, one example of an approach for managing the PI value of a selected product based upon sales information is described. At step 202, sales data related to a first product purchased by a customer in a retail store is transmitted from the retail store to a central processing center. The sales data may be structured according to any type of data format.

At step 204, the sales data is received at the central processing center. A data structure is created and stored at a database at the central processing center. The data structure programmatically links the first product to a second product. The second product is historically purchased by the customer whenever the customer has also purchased the first product. For example, the customer may always purchase apples and bananas together.

At step 206, at the central processing center, a determination is made as to whether the customer purchased the second product together with the first product based upon the sales data. In these regards, the sales data may include information about each customer trip to the retail store and the purchases made during that trip. An analysis of this information locates the first product within the data for a particular customer trip and determines whether the customer purchases the second product during the same customer trip.

At step 208, when the customer has failed to purchase the second product with the first product, instructions are transmitted from the central processing center to the retail store over the network to perform a verification that the second product is out-of-stock. The instructions may be in any type of format and may cause an automated vehicle to search the entire store (or portions of the store such as the shelves or other areas where the product is placed for retail sales) to verify that the product is missing. Alternatively, instructions can be sent to the retail store (or an employee of the retails store) to have the employee search for the product.

At step 210, an outcome of the verification from the retail store is received at the central processing center via the network. The verification can be received, in aspects, from an automated vehicle or an employee and indicates whether the product was located.

At step 212 and at the central processing center, a determination is made as to a level of certainty that the second product is actually out-of-stock based upon an analysis of the sales data and the outcome of the verification. As discussed elsewhere herein, various approaches can be used to determine whether the level of certainty is high or low. Different inputs (e.g., visual images from the store, the customer's path through the store, the customer's purchase history, to mention a few examples of information) can be used to determine the level of certainty. Additionally, the results of verifications (or certainty level calculations) performed or made at other retail stores can be considered (e.g., whether the product was ever located). Thus, the experience and knowledge gained from decisions made with respect to other stores can be applied to obtain better decisions with respect to levels of certainty for the current store being evaluated. Each of these inputs can be weighted. The level of certainty may be calculated as a number by summing the weighted contribution of each input.

At step 214 when the level of certainty exceeds a predetermined threshold, the PI value is adjusted to zero. In this case, a high degree of confidence exists that the item is missing from the store such that the PI value can be set to 0 (or in some cases, some other appropriate number). When the level of certainty does not exceed the threshold, no change to the PI is made. In this later case, there is not a high enough degree of certainty that the product is missing from the store.

Figure 3:
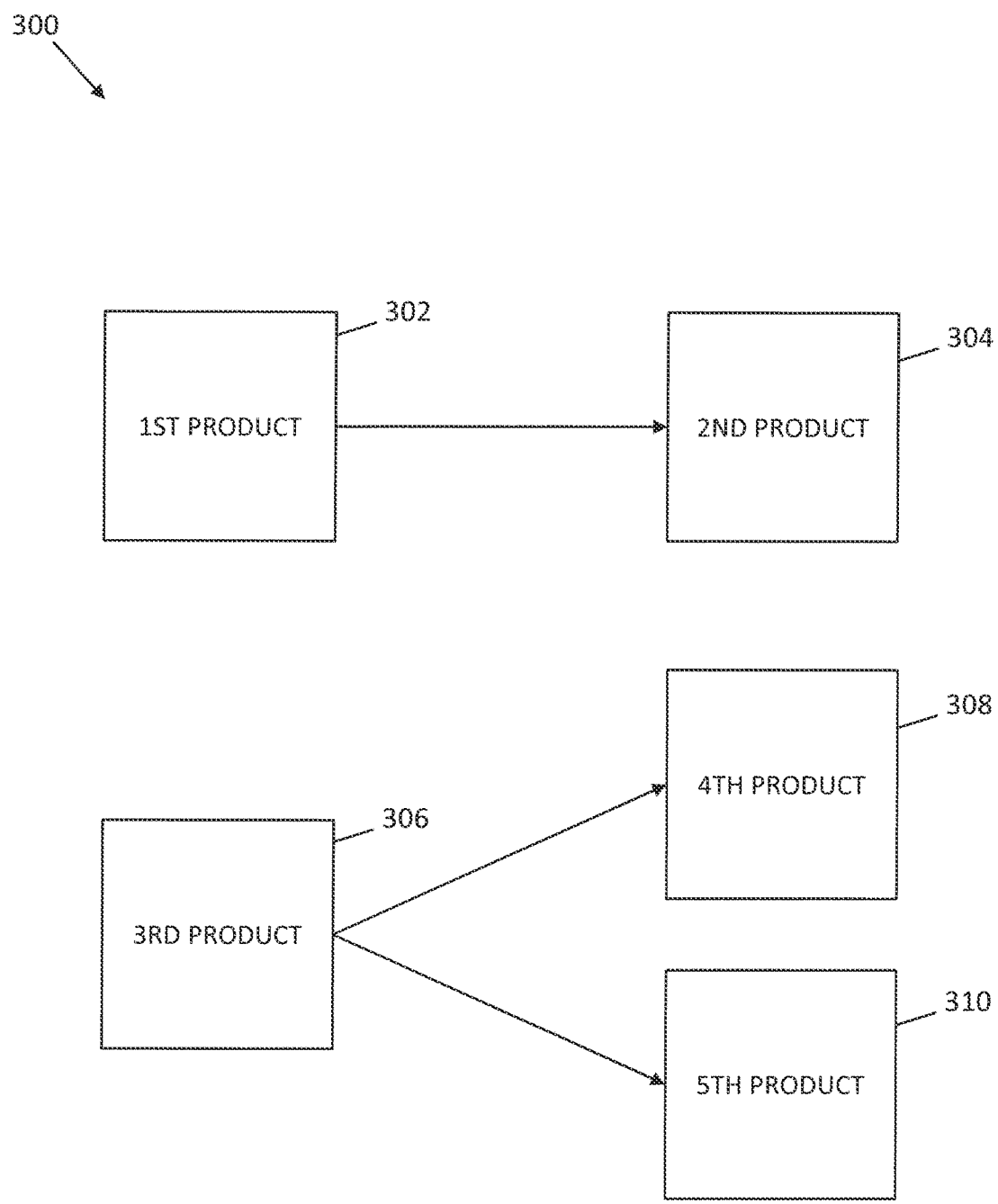
FIG. 3 is a block diagram of a data structure used in a system that adjusts the PI of a product using customer sales data in accordance with some embodiments.

Referring now to FIG. 3, one example of a data structure 300 that may be used in the approaches of FIG. 1 and FIG. 2 is described. In aspects, the data structure 300 may be stored at a database at the central processing center.

The data structure 300 programmatically links a first product 302 to a second product 304. The second product 304 is historically purchased by the customer whenever the customer has also purchased the first product 302.

The data structure 300 programmatically links a third product 306 to a fourth product 308, and a fifth product 310. The fourth product 308 and the fifth product 310 are historically purchased by the customer whenever the customer has also purchased the third product 306.

It will be appreciated that the data structure 300 may be implemented in any programming language with any type of data elements. For example, the data structure 300 may be implemented as a look-up table or with pointers.

Figure 4:
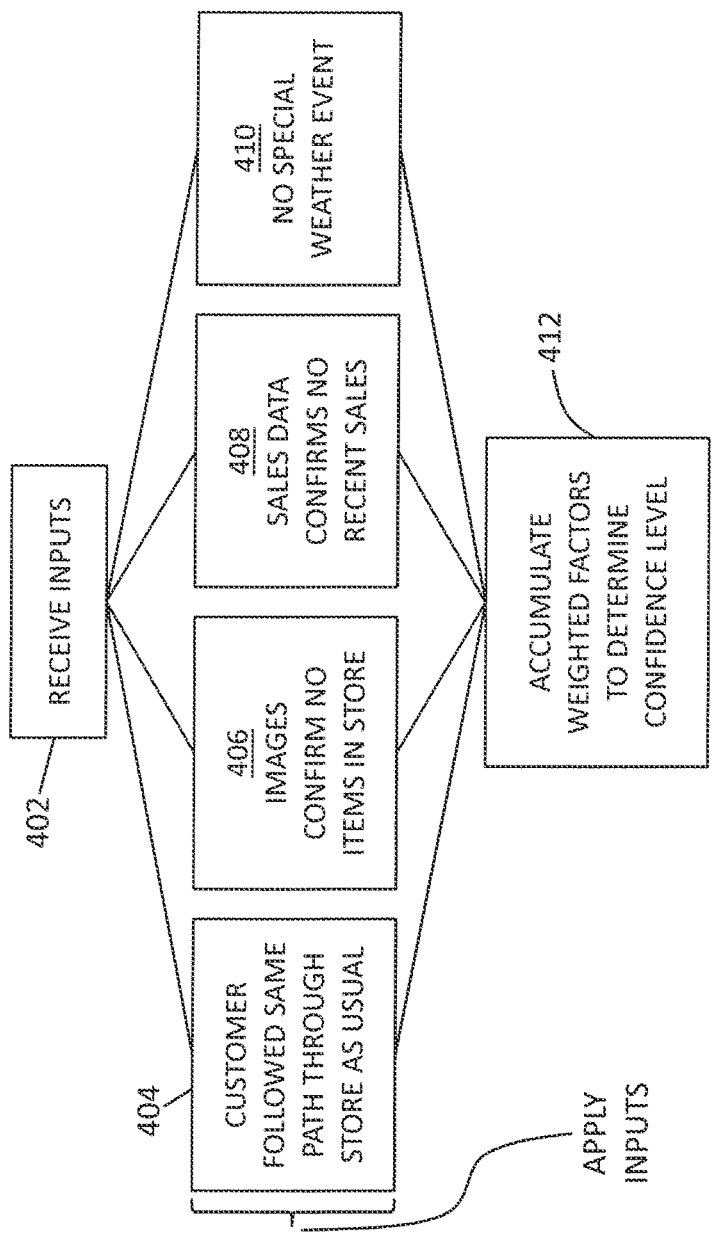
FIG. 4 is a flowchart of one approach for determining the confidence level of adjusting the PI value in accordance with some embodiments.

Referring now to FIG. 4, one example of an approach for determining the level of certainty is described. It will be appreciated that the approach of FIG. 4 is one example and considers only some factors. The particular factors selected and the weight attached to these factors can vary according to the needs of the system or the user. It will be appreciated that the approach of FIG. 4 may be performed at a central processing center.

At step 402, inputs are received. The inputs include sales data from the store. This may be obtained from point-of-sale devices such as cash registers. Information concerning the path a customer the customer takes through the store can also be obtained. Customer movement information may be obtained by sensors (e.g., cameras recording the movement of the customer, or sensing RFID tags of products in the shopping cart of a customer and tracking these as the customer moves through the store). Information concerning weather events may also be received. In some aspects, this information may be manually entered into the system by an employee. Other information concerning whether the item is in the store may also be received. In aspects, this information may include visible images obtained by various cameras in various locations in the store. These images may confirm that the product is not present, for example, on the shelves or in a back room (that is not accessible to the public).

The analysis of these inputs to determine a confidence level occurs at steps 404, 406, 408, and 410. If a test at each of these steps confirms that the factor is true, then the weighted value of the factor is included in a summation. The summation represents the confidence level that the product is truly out of stock. For instance, assuming that each step has a weighting factor of 0.25, if all steps were true, then the confidence level is 1 indicating a very high confidence the product is missing from the store. If only two out of four were true, the confidence level would be 0.25 plus 0.25 to equal 0.5, representing a 50 percent chance the product is missing.

Now considering these steps in greater detail, at step 404, it is determined whether the customer followed their usual path through the store. For example, information received at step 402 (showing the customer's path through the store), may be compared to the path usually followed through the store. If the current path deviates beyond a predetermined amount or distance from the usual path, then factor 404 may be set to false. Otherwise, the result of step 404 is set to be true (indicating the customer intended not to purchase the second product).

At step 406, images from the store may be analyzed to determine if the product is in the store. When the images do not contain the product, this factor may be set to true. Otherwise, the result of step 406 is set to false.

At step 408, the sales data from the store is analyzed. For example, no recent purchases of the item from the store may indicate the product is not available and this factor may be set to true. Otherwise, the result of step 408 is set to false.

At step 410, analysis may be made to determine if a special weather event occurred. For example, occurrence of a severe weather event may cause this factor to be set to true (e.g., indicating a shipment has been missed due to the weather and that the product is missing from the store). The non-occurrence of a weather event may cause this factor to be set to false.

At step 412, results at each of the steps 404, 406, 408, and 410 are weighted and summed together. The weights in one aspect should sum to be 1.00. Assuming that each step has a weighting factor of 0.25, if all steps were true, then the confidence level is 1 indicating a very high confidence the product is missing from the store. If only two out of four were true, the confidence level would be 0.25 plus 0.25 or 0.5 representing a 50 percent chance the product is missing.

Once the confidence level is determined, it can be utilized to determine whether the PI is to be changed. In one example, if the confidence level exceeds a predetermined level (e.g., 90%), then the PI value can be changed to 0.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that is configured to adjust perpetual inventory (PI) values of products, the system comprising;
   a first retail store;
   a plurality of other retail stores;
   a database that includes a data structure, the data structure programmatically linking a first product to a second product, the second product being historically purchased by a customer whenever the customer has also purchased the first product, the database disposed at a central processing center;
   a control circuit coupled to the first retail store and the plurality of other retail stores via an electronic network, the control circuit also coupled to the database, wherein the control circuit includes one or more transceivers that allow the control circuit to communicate with the first retail store and the plurality of other retail stores via the electronic network, the control circuit disposed at the central processing center and configured to:
   determine whether the customer purchased the second product together with the first product based upon an analysis of sales data relating to the first product being purchased by the customer at the first retail store;

when the customer has failed to purchase the second product with the first product, transmit electronic instructions to the first retail store, the electronic instructions being effective to cause a verification by an automated device or a human at the first retail store that the second product is out-of-stock;

wherein the verification performed by the automated device includes the automated device traversing the first retail store and maneuvering around shelves in the first retail store;

receive an outcome of the verification from the first retail store, the outcome being transmitted from the first retail store via the electronic network; and determine a level of certainty that the second product is actually out-of-stock based upon an analysis of the sales data, the outcome of the verification, and results of verifications at the plurality of other retail stores;

when the level of certainty exceeds a predetermined threshold, adjust the PI value to zero.

2. The system of claim 1 wherein the automated device comprises an automated vehicle.

3. The system of claim 2, wherein the human assists the automated vehicle in making the verification.

4. The system of claim 2, wherein the automated vehicle is an aerial drone or a ground vehicle.

5. The system of claim 1, wherein the electronic instructions further include a message to an employee at the first retail store to verify that the second product is not present at the first retail store.

6. The system of claim 1, wherein the sales data is data selected from the group consisting of: point-of-sale data indicating that the customer purchased the first product but not the second product, a scan of a shelf where the second product is disposed, demographic information of the customer, information related to a weather event, information concerning how the customer paid for the first product, and information concerning the path of the customer through the first retail store.

7. The system of claim 1, wherein the electronic instructions are transmitted by the electronic network.

8. The system of claim 7, wherein the electronic network is the cloud network.

9. The system of claim 1, wherein the control circuit is further configured to transmit the adjusted PI value to the first retail store via the electronic network.

10. A method, the method comprising:
providing a first retail store and a plurality of other retail stores;
storing a data structure at a database at a central processing center, the data structure programmatically linking a first product to a second product, the second product being historically purchased by a customer whenever the customer has also purchased the first product;
determining at a control circuit deployed at the central processing center whether the customer purchased the second product together with the first product based upon sales data relating to the first product being purchased by the customer at the first retail store;
wherein the control circuit includes one or more transceivers that allow the control circuit to communicate with the first retail store and the plurality of other retail stores via an electronic network;
when the customer has failed to purchase the second product with the first product, transmitting electronic instructions from the control circuit to the first retail store over the electronic network to perform a verification by an automated device or a human that the second product is out-of-stock;
wherein the verification performed by the automated device includes the automated device traversing the first retail store and maneuvering around shelves in the first retail store;
at the control circuit,
receiving an outcome of the verification;
determining at the control circuit a level of certainty that the second product is actually out-of-stock based upon an analysis of the sales data, the outcome of the verification, and results of verifications at the plurality of other retail stores;
when the level of certainty exceeds a predetermined threshold, by the control circuit adjusting the PI value to zero.

11. The method of claim 10, wherein the automated device comprises an automated vehicle.

12. The method of claim 11, wherein the human assists the automated vehicle in making the verification.

13. The method of claim 11, wherein the automated vehicle is an aerial drone or a ground vehicle.

14. The method of claim 10, wherein the electronic instructions further include a message to an employee at the first retail store to verify that the second product is not present at the first retail store.

15. The method of claim 10, wherein the sales data is data selected from the group consisting of: point-of-sale data indicating that the customer purchased the first product but not the second product, a scan of a shelf where the second product is disposed, demographic information of the customer, information related to a weather event, information concerning how the customer paid for the first product, and information concerning the path of the customer through the first retail store.

16. The method of claim 10, wherein the electronic instructions are transmitted by the electronic network.

17. The method of claim 16, wherein the electronic network is the cloud network.

18. The method of claim 10, further comprising the control circuit transmitting the adjusted PT value to the first retail store via the electronic network.

* * * * *